United States Patent [19]

Karlecik-Maier

[11] Patent Number: 5,717,580
[45] Date of Patent: *Feb. 10, 1998

[54] METHOD AND CONTROL ARRANGEMENT FOR DC TRANSMISSION, AND A CONTROL DEVICE

[75] Inventor: Franz Karlecik-Maier, Bundesrepublik, Germany

[73] Assignee: Siemens Aktiengesellschaft, München, Germany

[*] Notice: The term of this patent shall not extend beyond the expiration date of Pat. No. 5,627,734.

[21] Appl. No.: 525,569

[22] PCT Filed: Mar. 2, 1994

[86] PCT No.: PCT/DE94/00226

§ 371 Date: Sep. 18, 1995

§ 102(e) Date: Sep. 18, 1995

[87] PCT Pub. No.: WO94/22199

PCT Pub. Date: Sep. 29, 1994

[30] Foreign Application Priority Data

Mar. 16, 1993 [DE] Germany ............... 43 08 363.3

[51] Int. Cl.$^6$ ................................................. H02J 3/36
[52] U.S. Cl. ........................................ 363/35; 363/51
[58] Field of Search ............................ 363/35, 37, 51, 363/98, 79, 96

[56] References Cited

U.S. PATENT DOCUMENTS

| 4,494,179 | 1/1985 | Inokuchi et al. | 363/35 |
| 4,598,350 | 7/1986 | Sakai et al. | 363/35 |
| 4,649,466 | 3/1987 | Rogowsky | 363/35 |

FOREIGN PATENT DOCUMENTS

| 0 372 555 | 10/1983 | Austria . |
| 0 367 247 | 5/1990 | European Pat. Off. . |
| 33 26 947 | 2/1985 | Germany . |
| WO92/22118 | 12/1992 | WIPO . |

Primary Examiner—Peter S. Wong
Assistant Examiner—Y. J. Han
Attorney, Agent, or Firm—Kenyon & Kenyon

[57] ABSTRACT

In order to permit an improved operational performance of DC transmission, a method is provided which has an associated control arrangement and control device (11a, 11b) and in which, starting from a common working point (A) with predetermined current and voltage values (UA, IA) the respective control devices (11a, 11b) of converters (5a, 5b) respectively assigned to three-phase systems (3a, 3b) are respectively fed system deviations (ΔAa, ΔAb) relative to the working point (A). The respective controlled variable is employed in order to reach the working point (A), minimizing the respective system deviation (ΔAa, ΔAb). The control method and the associated devices preferably operate according to the principle of vectorial control.

11 Claims, 4 Drawing Sheets

METHOD AND CONTROL ARRANGEMENT FOR DC TRANSMISSION, AND A CONTROL DEVICE

BACKGROUND OF THE INVENTION

The invention relates to a method for DC transmission between two converters. It also relates to a control arrangement for DC transmission between two converters and to a control device for that purpose.

In order to transmit electrical energy between two AC voltage networks, use is made, inter alia, of so-called DC transmission. In this case, there is connected to an AC voltage network a rectifier which generates a direct current which is fed, in turn, to an inverter. The inverter is connected to the second AC voltage network. In this way, the two AC voltage networks are coupled to one another via a DC connection. Such a DC transmission is disclosed in, for example, WO 92/22 118. The direction of energy flow can also be reversible in this case.

Various control methods are applied for operating such arrangements. An example of this is the so-called marginal current method, which is also disclosed in EP 0 197,352 B1. In this case, the rectifier and inverter each have a current controller whose characteristics are offset from one another by a marginal current. It is also possible in this case for both converters to have a voltage controller. In this way, each converter is assigned a precisely defined dynamic characteristic for the rectifier and inverter, which in each case has a current branch and voltage branch. The point of intersection of the respective dynamic characteristics then yields in operation the working point of the overall arrangement. Depending on the instantaneous operating situation, in such an arrangement only one controller (current or voltage) is ever active. The remaining controllers are not operative.

SUMMARY OF THE INVENTION

The present invention to specifies a method and a control arrangement by means of which the control response is improved in the case of DC transmission. Furthermore, the intention is to specify a control device suitable for this purpose.

The object is achieved according to the present invention by means of a method for DC transmission between converters, in particular for a high-voltage DC transmission system, to which converters there is respectively assigned a control device for forming their respective control angles. Using this method and starting from a common working point, each control device is respectively fed a system deviation relative to the working point in the case of a prescribable current and voltage value, and in which the respective control angle is employed in order to reach the working point, minimizing each system deviation.

Starting from a prescibable current and voltage value belonging to the common working point of the power to be transmitted between the converters, each control device is respectively fed a two-dimensional system deviation from the common working point. The respective control angles of the converters are then calculated in order to reach the common working point by minimizing each two-dimensional system deviation. The minimization of the two-dimensional system deviation is performed simultaneously for both dimensions of the system deviation.

A substantial improvement in the control response of the DC transmission is achieved by the present invention, the dynamic performance being enhanced. Compared with the past, the DC transmission is substantially more insensitive to harmonic components and instabilities, thereby resulting in an increase in stability during transmission.

The respective system deviations are preferably described as at least two-dimensional variables, in particular as vectorial or complex variables. Current and voltage values are expediently employed as controlled variables. It is advantageous if the values for the working point are derived from a power to be transmitted. All that is then required is to prescribe a value as setpoint selection for the working point and to calculate each system deviation from the instantaneous current and voltage values of the respective converter. These respective embodiments permit the DC transmission to be further improved in a simple way using existing controlled variables.

A further solution to the problem is achieved according to the present invention by means of a control arrangement for DC transmission between AC networks by means of converters, in which a control device for forming a control angle is connected upstream of each controlling system of the converters, each control device is fed a system deviation relative to a common working point with a predetermined current and voltage value, and each control device employs the respective control angle, and the control devices simultaneously minimize each system deviation.

This simple controller structure can be used to realize vector control for a converter station of a DC transmission. The design of the control arrangement is astoundingly simple in this case.

In an advantageous embodiment, the control arrangement has for each converter, respectively, two controllers which are fed respectively assigned components of a two-dimensional system deviation relative to a common working point, their output signals being combined by an adder to form the control angle. As an alternative to this, it is also possible, firstly, to add the two-dimensional system deviations and then to feed them to a controller for forming the control angle. A simple design of the control arrangement is provided in this way with few components.

In order to achieve the further object, according to the present invention, control devices constructed according to the embodiments described above are provided for the purpose of application in DC transmission.

These control devices can preferably be used as vector controllers, it being the case, in particular, that the embodiment in accordance with FIG. 11 displays a fast controlled response, as a result of which an improved dynamic performance is provided in general. Moreover, only one controller is required.

The invention is advantageously realizable both in analog technology and in digital technology by means of a program and a computer. The DC transmission is also not restricted to two converter stations. It can also comprise a multiplicity of converters for multipoint operation.

BRIEF DESCRIPTION OF THE DRAWINGS

The invention and further advantages are explained in more detail below by way of example, with the aid of variant embodiments and the drawings.

DETAILED DESCRIPTION

In the following embodiments, the index letters a and b respectively characterize the rectifier side and inverter side. To the extent that it is unnecessary, only the general reference symbols without index letters are shown.

Figure 1:
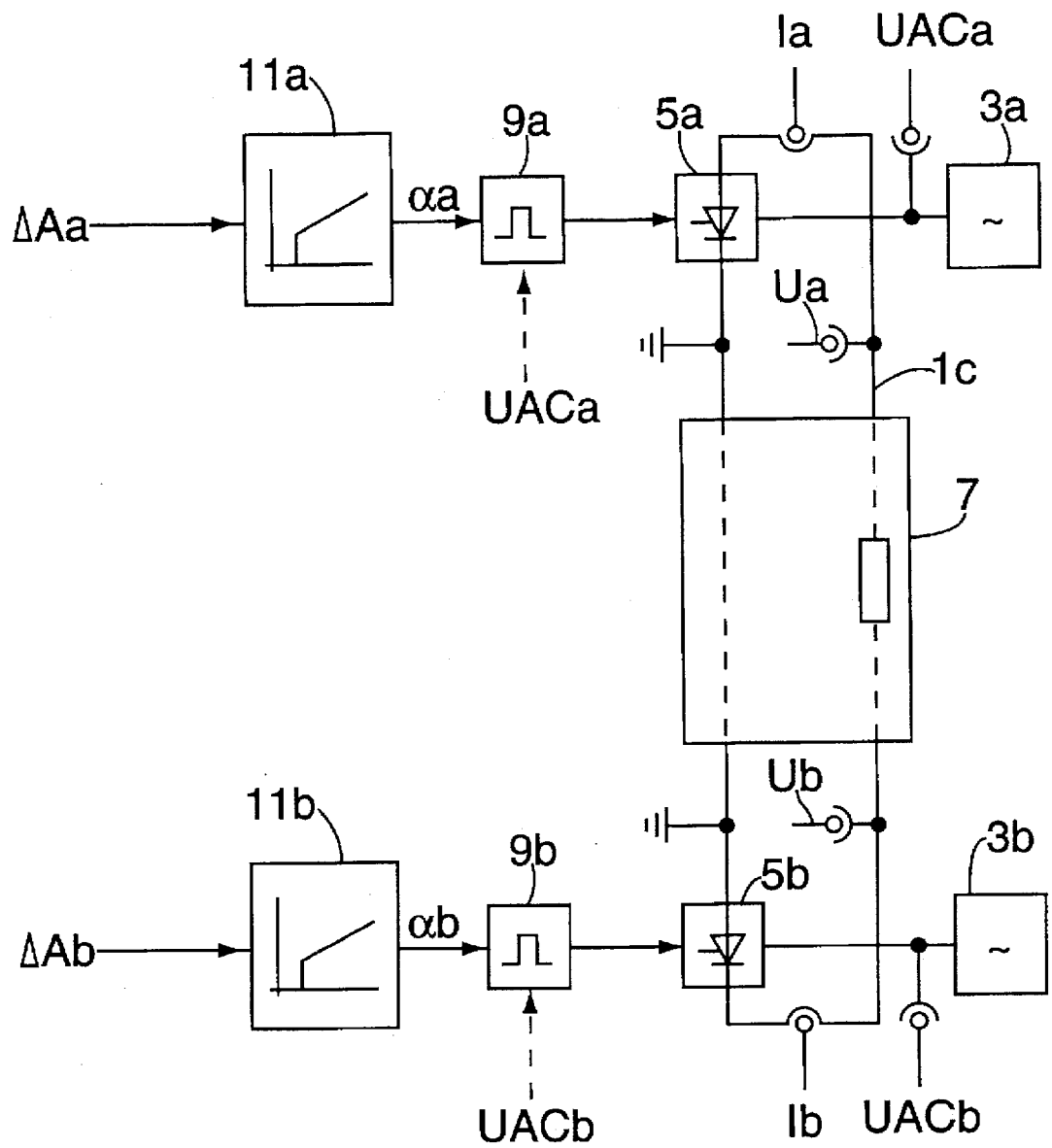
FIG. 1 shows a first arrangement for DC transmission.

FIG. 1 shows the principle of the arrangement 1c for DC transmission, in which a first and a second AC network or three-phase system 3a and 3b, respectively, are connected to one another. The arrangement 1c additionally has two converters 5a, 5b which are connected to one another on the DC side via a DC connection 7. On the side of the three-phase system, the two converters 5a, 5b are respectively connected to one of the three-phase systems 3a, 3b. At prescribed points, the arrangement 1c has sensors (not shown in more detail) for generating the measured current and voltage values Ia, Ib, and Ua, UACa, Ub, UACb, respectively.

Depending on the design of the DC connection 7, the entire arrangement 1c can be constructed, for example, as a back-to-back link or as a long-distance transmission system. This relates, in particular, to application in the case of HVDC transmission systems, which serve to couple energy networks. It is to be assumed below that energy is being transported from the three-phase system 3a to the three-phase system 3b. In this case, one converter 5a serves as rectifier 5a, and the converter 5b serves as inverter 5b. A reversal of energy is also possible, of course. What is said below can be applied analogously for alternating directions of energy.

Each converter 5a, 5b is assigned a controlling system 9a and 9b, respectively, which, as the case may be, is fed the measured voltage value UACa and UACb, respectively and, from a control device 11a and 11b, respectively, an associated control signal, specifically a control angle αa and αb, respectively.

Figure 6:
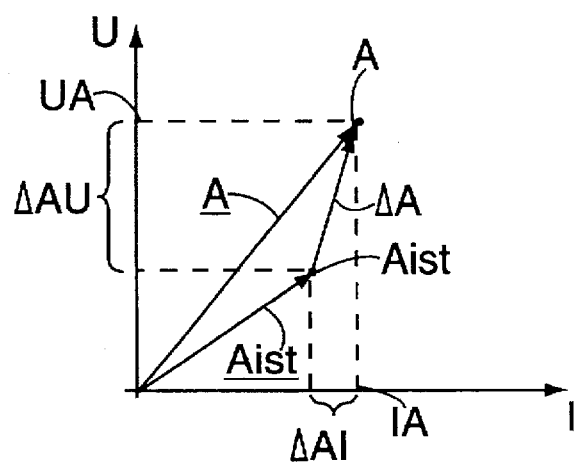
FIG. 6 shows a diagram relating to the working point of the arrangement.

Starting from this configuration, it is essential for the operation of the arrangement 1c, that in the case of steady-state operation, for example of a given power P to be transmitted, the two converters 5a, 5b are tuned to one another in order to permit operation which is as far as possible lossless and at the same time stable. In addition, they are tuned to a common working point A, which is shown in FIG. 6 in a current-voltage diagram I/U. This working point A holds for the ideal state, that is to say in the case of a lossless DC connection 7. In reality, however, there are two working points, which the person skilled in the art is aware of and prescribes on the basis of plant conditions. Starting from the power P to be transmitted, the common working point A describes the current IA and the voltage UA for the DC connection 7 (in this regard, see also the following description relating to FIG. 6).

The power P to be transmitted is generally a value which is constant and which is changed, at most, at long time intervals. In practice, this value is relayed, for example in the case of long-distance transmission, by telephone telecommunication from one converter station to the other, for example from the rectifier 5a to the inverter 5b. The power P therefore represents the steady-state operating capacity, as it were.

In the present case, this working point A is regarded as a two-dimensional variable which is to be approached by the two converters 5a and 5b working together. For this purpose, the control devices 11a and 11b are fed a multidimensional system deviation ΔA, specifically ΔAa and ΔAb, respectively. The outcome of this vectorial approach is that the respective converter, 5a or 5b, reaches the working point A as far as possible on a direct path, and therefore takes up operation at the working point as quickly as possible. Although each converter 5a, 5b heads for the working point A autonomously, this is the same, in terms of the overall aim, as reaching the working point A together. There is thus a common approach, the two converters 5a, 5b always making a contribution. In this case, there is at least always one control operation present simultaneously at the two converters 5a, 5b, by contrast with only one in the prior art.

Reference may be made to the diagram in FIG. 6 for the purpose of a more detailed explanation of this mode of operation. There, the current-voltage diagram I/U shows the prescribed working point A which is to be reached. The instantaneous working point is denoted by Aist. These two working points are represented as vector variables by $\underline{A}$ and $\underline{Aist}$. The difference of these two vectors yields the system deviation vector $\underline{\Delta A}$. The projection of this vector $\underline{\Delta A}$ produces the system deviations ΔAU and ΔAI, which correspond, respectively, to the system deviations of a voltage or current controller in the conventional technology. In order to reach the working point A (by correcting the converter control signals), it is necessary for the modulus of the system deviation ΔA, that is to say |ΔA|, to be adjusted to zero, that is to say ΔAU and ΔAI must simultaneously be zero. It follows from this that this control task can be executed using optionally one or two controllers. Embodiments of such controllers are explained in more detail in the description relating to FIGS. 4 and 5.

Figure 2:
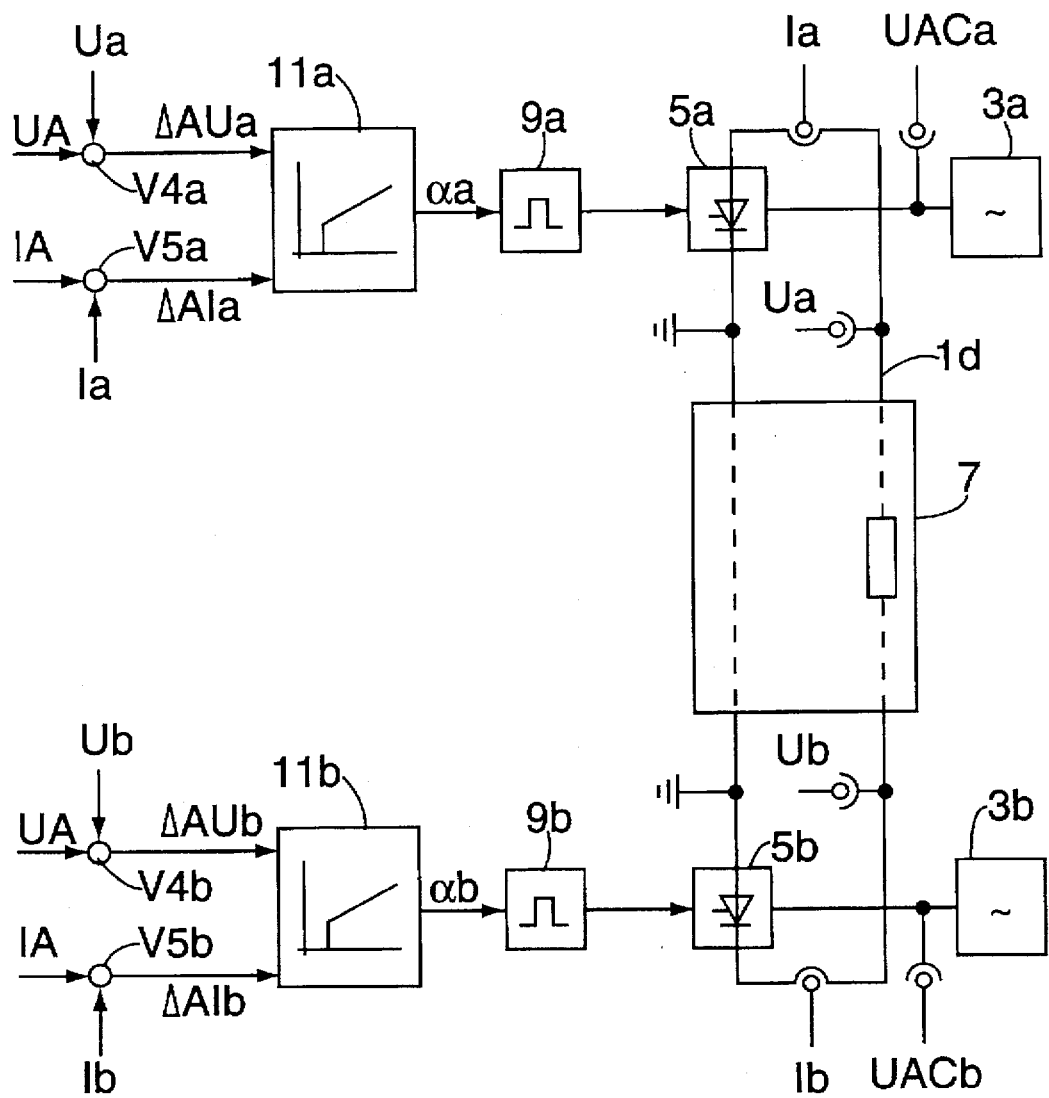
FIG. 2 shows a second arrangement for DC transmission.

FIG. 2 shows a further arrangement 1d, in which the general system deviation ΔA per converter branch is prescribed two-dimensionally by ΔAI and ΔAU. These system deviations ΔAI and ΔAU are determined, by means of comparators V4a, V5a and V4b, V5b, respectively, by forming the difference between the actually measured variables at the converter 5a, 5b, specifically Ua, Ia and Ub, Ib respectively, and the values for UA and IA resulting by computation from the working point A. Of course, it is also possible to prescribe the two-dimensional variable in another way, for example as a vector or complex variable. The present values ΔAU and ΔAI can also be denoted as the projection of the vectorial deviation relative to the working point A. The control devices 11a, 11b can therefore, so to speak, be denoted as vector controllers or vector control devices.

Figure 3:
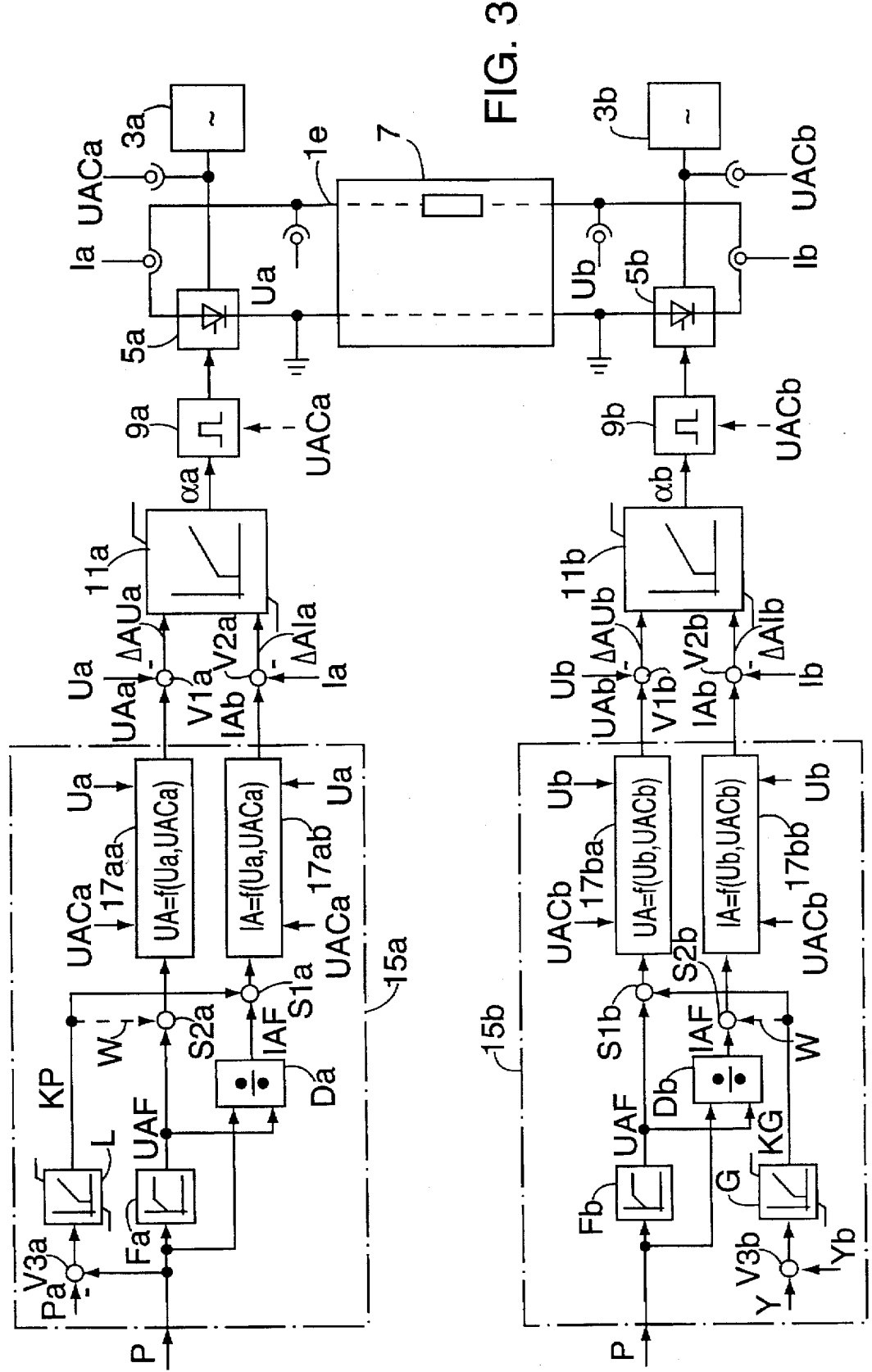
FIG. 3 shows a third arrangement for DC transmission.

FIG. 3 shows a further arrangement 1e in which, building on the arrangement 1d in accordance with FIG. 2, control arrangements 15a and 15b are connected upstream of the respective control devices 11a and 11b, respectively. The said arrangements essentially serve the purpose, starting from the power P to be transmitted and taking account of actual operating states on the DC connection 7 and/or in the three-phase systems 3a and 3b, of reaching a common working point A as quickly as possible. For this purpose, the processing of the measured values is firstly described below for the rectifier side.

Starting from the prescribed power P, the fixed values for current and voltage IAP and UAF are determined in the control arrangement by means of a function generator Fa and a divider Da. The currently measured power Pa, which is determined (in a manner not shown in more detail) per converter branch from the measured current and voltage values Ia, Ua and Ib, Ub, respectively, present on the spot, is compared with the power P in the comparator V3a. The output signal of the comparator V3a is fed to an output regulator L. The latter supplies a correction value KP for influencing the fixed values IAF and/or UAF via summers S1a and, optionally, S2a.

Downstream strategy elements 17aa and 17ab contain functions, preferably modes of procedure and tactics as to how, for example, to proceed in the case of faults or in deviant operating states. For this purpose, in each case the instantaneous DC and AC voltages Ua and UACa, respectively, of the rectifier 5a, are fed to the strategy elements 17aa and 17ab. This is particularly important for handling cases of faults in which it is necessary to react particularly quickly. In the case of a fault, specifically, a new working point is, as it were, defined for the converters 5a, 5b, and is to be reached as quickly as possible. In this way, the new mode of procedure orientated to the working point is also exceptionally effective for mastering critical operating states or for changing working points under special conditions.

It is preferably a matter of course that still further parameters or measured operating values of the respective converters 5a and 5b, respectively, and if necessary also of the remote station, can be recorded and processed in the strategy elements 17aa, 17ab, in accordance with weighted points of view. Fuzzy logic elements, for example, may also be applied in this case. The said elements are distinguished in special cases as particularly quick, being outstandingly suitable in this regard for fault strategies, in particular. A mode of procedure employing a neural network is also conceivable, so that the entire control is, as it were, a self-learning one, and returning operating situations are therefore better mastered. The control arrangement 15a supplies at its outputs the values UAa and IAa required for the vectorial control.

The processing of measured values for the inverter 5b in the control arrangement 15b is performed with respect to the fixed values UAF and IAF in a manner analogous to the processing outlined above in the case of the rectifier 5a. Here, however, instead of the actually measured power Pa, it is the difference between a prescribed extinction angle and the actual extinction angle b in the gamma controller G which is processed. The extinction angle b is (as not shown in more detail) likewise determined from the respective measured current and voltage values Ib, Ub or UACb. The further processing of measured values is performed in a manner analogous to that described above in the case of the rectifier 5a.

Alternative or additional linkages between the individual modules or control elements are indicated by the connections W, which the person skilled in the art can provide according to need. In the present configuration in accordance with FIG. 3, the fixed working point current IAF of the rectifier is combined with a correction value KP of the higher-order output regulator L (with Pa being fed), which ensures that the desired extinction angle is set.

The fixed working point voltage UAF of the inverter is altered by a higher-order Gamma controller G (with being fed), likewise by means of a correction signal KG, such that the desired extinction angle is set. The effect of the higher-order control systems at the rectifier—output regulator+ vector controller, and at the inverter—controller+vector controller, is that the desired power P is transmitted at the highest efficiency.

Figure 4:
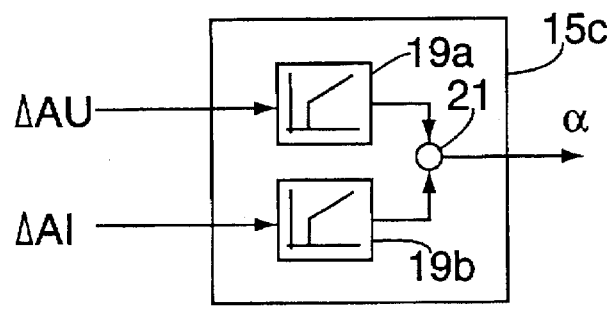
FIGS. 4 and 5 show control devices for use in the arrangements in accordance with FIGS. 1 to 3.
Figure 5:
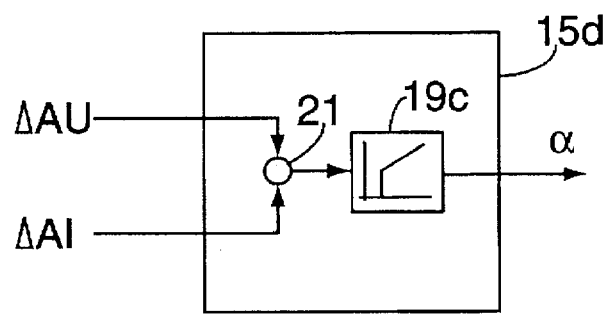

FIGS. 4 and 5 show controller designs 15c, 15d, as they can be applied in the control devices 11a and 11b in FIGS. 2 and 3 as vector controllers. They can also analogously be connected without their controllers 19a, 19b, 19c upstream of the control devices 11a, 11b in FIG. 1, with the result that the same function is obtained.

The design in accordance with FIG. 4 exhibits two controllers 19a and 19b which are respectively fed a system deviation ΔAU and ΔAI. Their output signals are combined with one another by means of an adder 21, with the result that a control angle signal α is generated. This design can be applied only in specific cases. The design in accordance with FIG. 5 is distinguished in that only one controller 19c is required. It has proved in practice that this design operates substantially better and, in particular, more quickly in special cases, as well.

What is claimed is:

1. A method for DC transmission between a plurality of converters in a high-voltage DC transmission system, each of said converters being controlled by an associated one of a plurality of control devices, comprising the steps of:
   determining a common working point of the power to be transmitted, said common working point having a predetermined current value and a predetermined voltage value;
   supplying each of said plurality of control devices a two-dimensional system deviation signal, said two-dimensional system deviation signal determined from the common working point;
   calculating a control angle for each of said plurality of converters and modifying said control angles to minimize each two-dimensional system deviation wherein the minimizing of the two-dimensional system is performed simultaneously for both dimensions of the system deviation signal.

2. The method of claim 1 wherein said system deviation signal comprises a vectorial variable.

3. The method of claim 2 wherein said system deviation signal is derived by calculating a current deviation and a voltage deviation, from the common working point, of each of said plurality of converters.

4. The method according to claim 3 wherein said system deviation signal is derived from the instantaneous current and voltage values of each of said plurality of converters and from the predetermined current and voltage values associated with said common working point.

5. The method according to claim 2 wherein said system deviation signal is derived from the instantaneous current and voltage values of each of said plurality of converters and from the predetermined current and voltage values associated with said common working point.

6. The method of claim 1 wherein said system deviation signal is derived by calculating a current deviation and a voltage deviation, from the common working point, of each of said plurality of converters.

7. The method according to claim 6 wherein said system deviation signal is derived from the instantaneous current and voltage values of each of said plurality of converters and from the predetermined current and voltage values associated with said common working point.

8. The method according to claim 1 wherein said system deviation signal is derived from the instantaneous current and voltage values of each of said plurality of converters and from the predetermined current and voltage values associated with said common working point.

9. A control system for DC transmission between AC networks which performs the steps of:
   determining a common working point of the power to be transmitted, said common working point having a predetermined current value and a predetermined voltage value;
   supplying each of a plurality of control devices a two-dimensional system deviation signal, said two-dimensional system deviation signal determined from the common working point;

calculating a control angle for each of a plurality of converters and modifying said control angles to minimize each two-dimensional system deviation wherein the minimizing of the two-dimensional system is performed simultaneously for both dimensions of the system deviation signal;

comprising:

a plurality of controlling systems, each of which couples one of said plurality of converters to one of said plurality of control devices;

each of said plurality of control devices being provided a two-dimensional system deviation from said common working point having a first dimension corresponding to a current value and a second dimension corresponding to a voltage value;

each of said plurality of control devices determining a control angle such that said two-dimensional system deviation will be minimized and such that said first dimension and said second dimension will be minimized simultaneously.

10. The control system according to claim 9 wherein at least one of said plurality of control devices comprises a first and a second controller, the input of said first controller being said first dimension of said two-dimensional system deviation signal, the input of said second controller being said second dimension of said two-dimensional system deviation signal and the outputs of said first and second controllers being combined to form said control angle.

11. The control system according to claim 9 wherein at least one of said plurality of control devices comprises an adder which combines said first dimension and said second dimension of said two-dimensional system deviation signal and a controller which forms said control angle from the output of said adder.

* * * * *